Jan. 20, 1942.   R. S. DRUMMOND   2,270,421
MACHINE FOR CUTTING GEARS
Filed Jan. 26, 1935   6 Sheets-Sheet 2
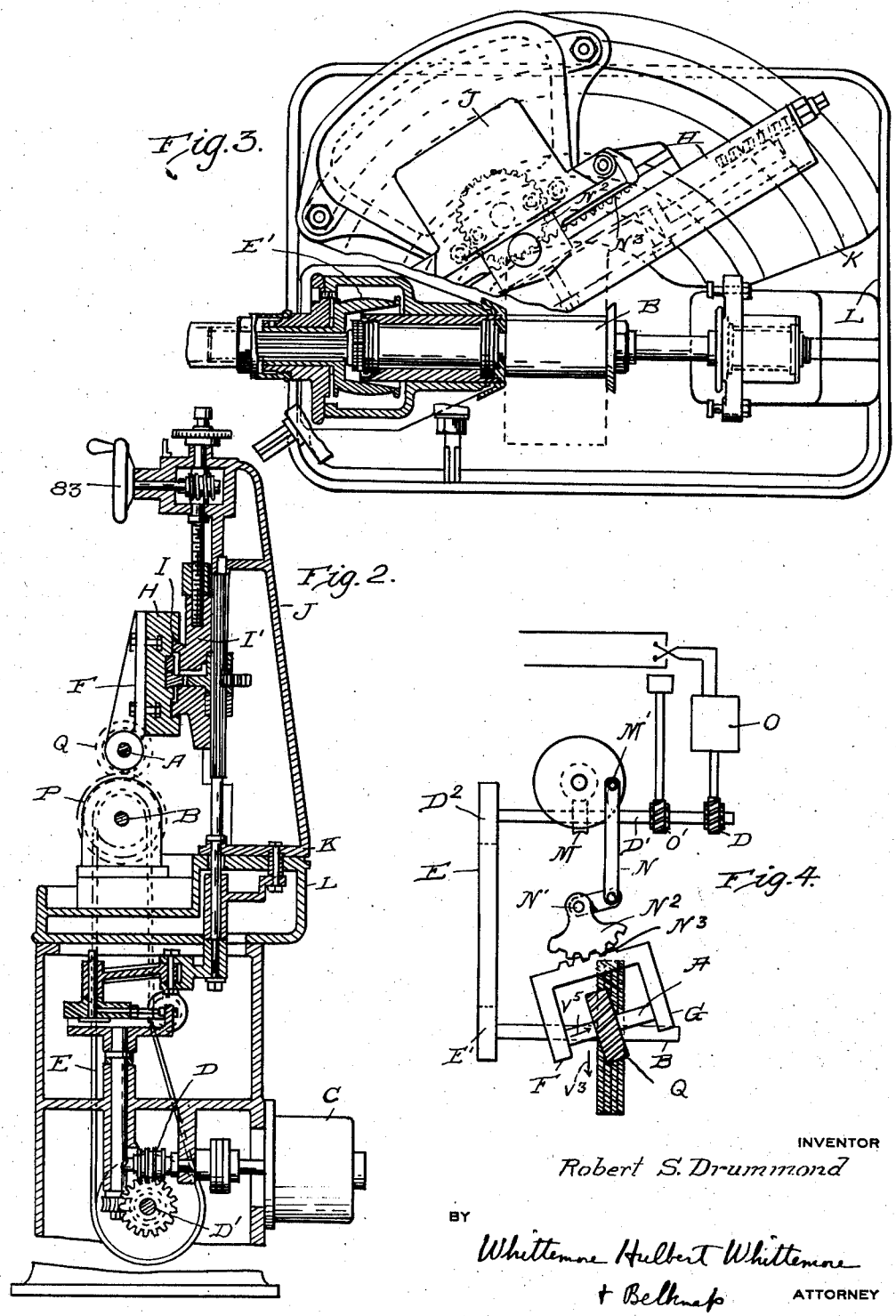
INVENTOR
Robert S. Drummond
BY
Whittemore Hulbert Whittemore
+ Belknap   ATTORNEY

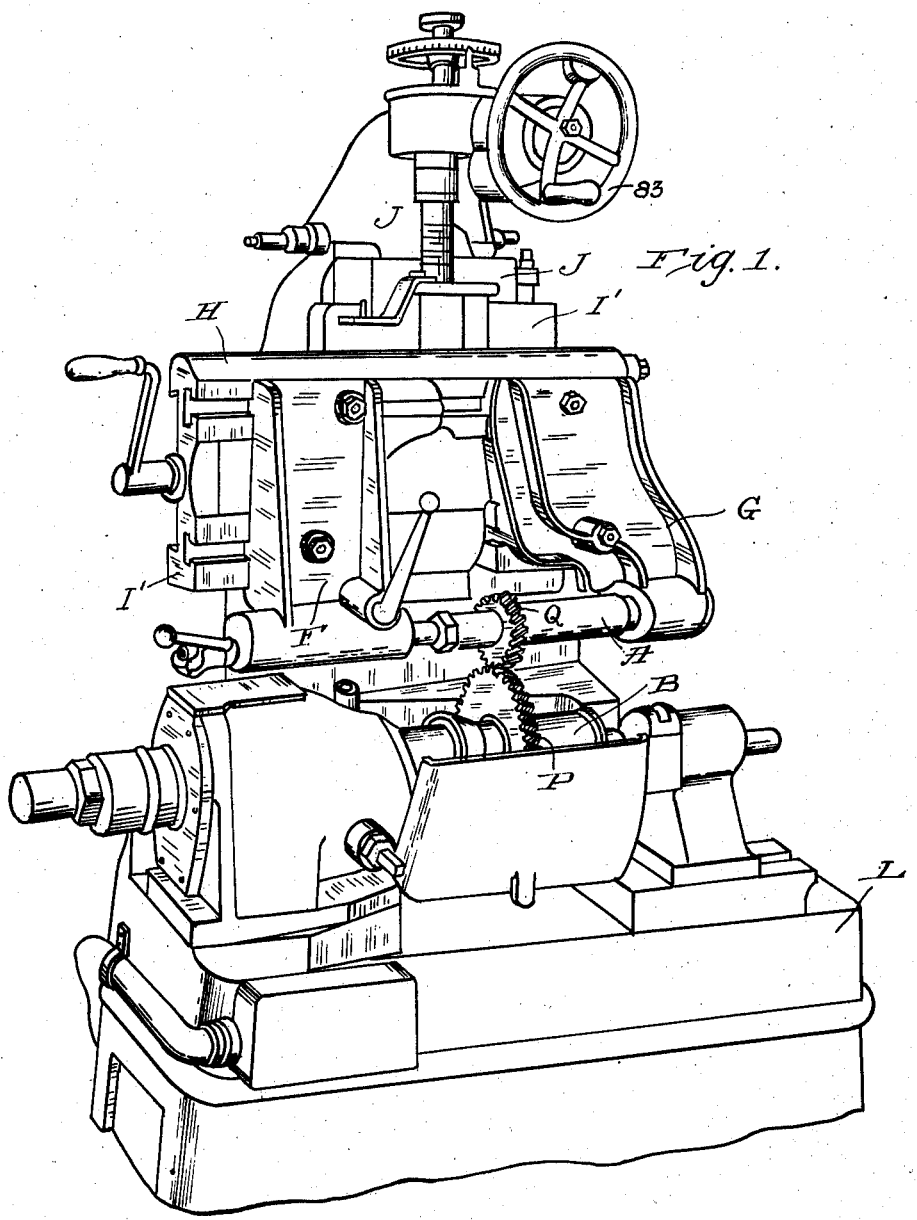

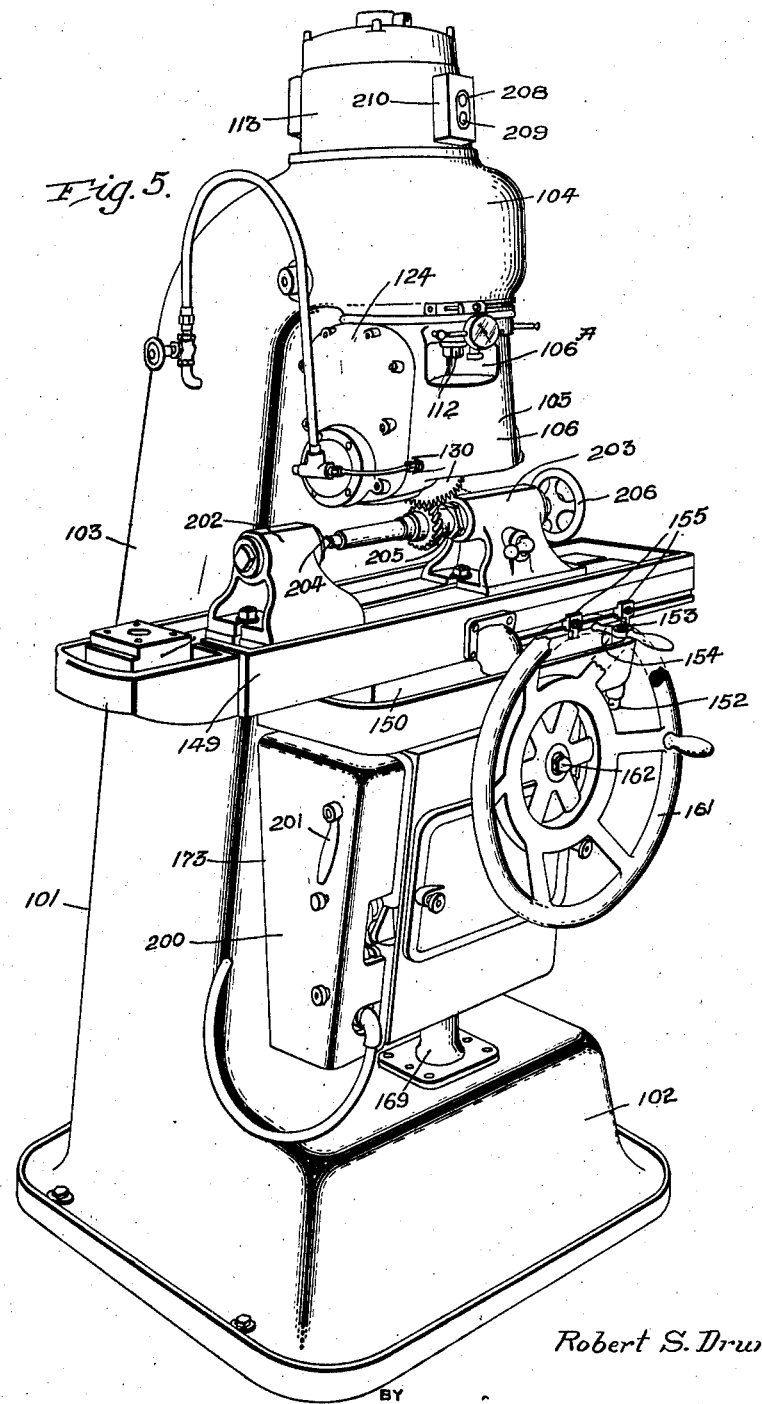

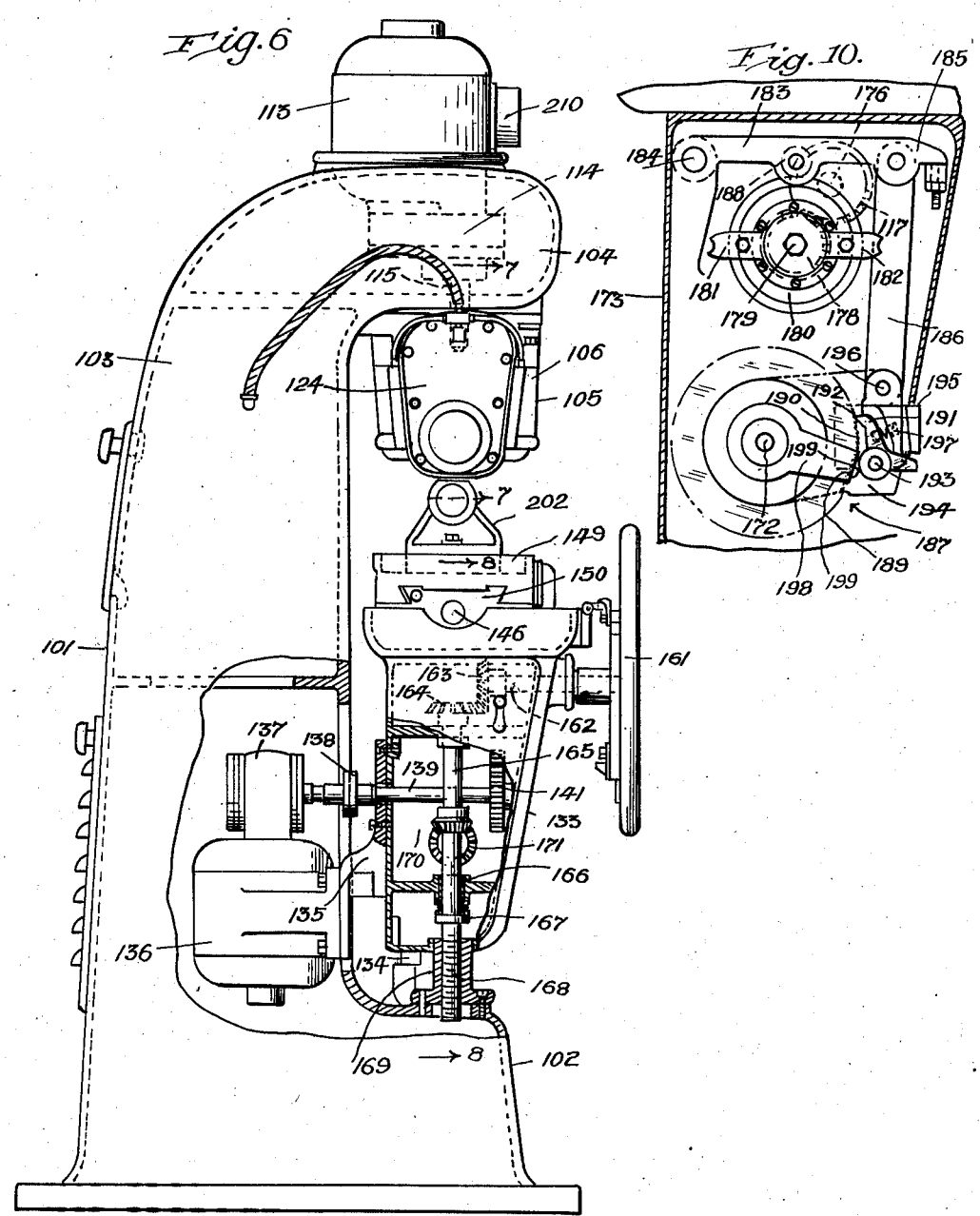

Jan. 20, 1942.                R. S. DRUMMOND                2,270,421
                          MACHINE FOR CUTTING GEARS
                            Filed Jan. 26, 1935              6 Sheets-Sheet 5
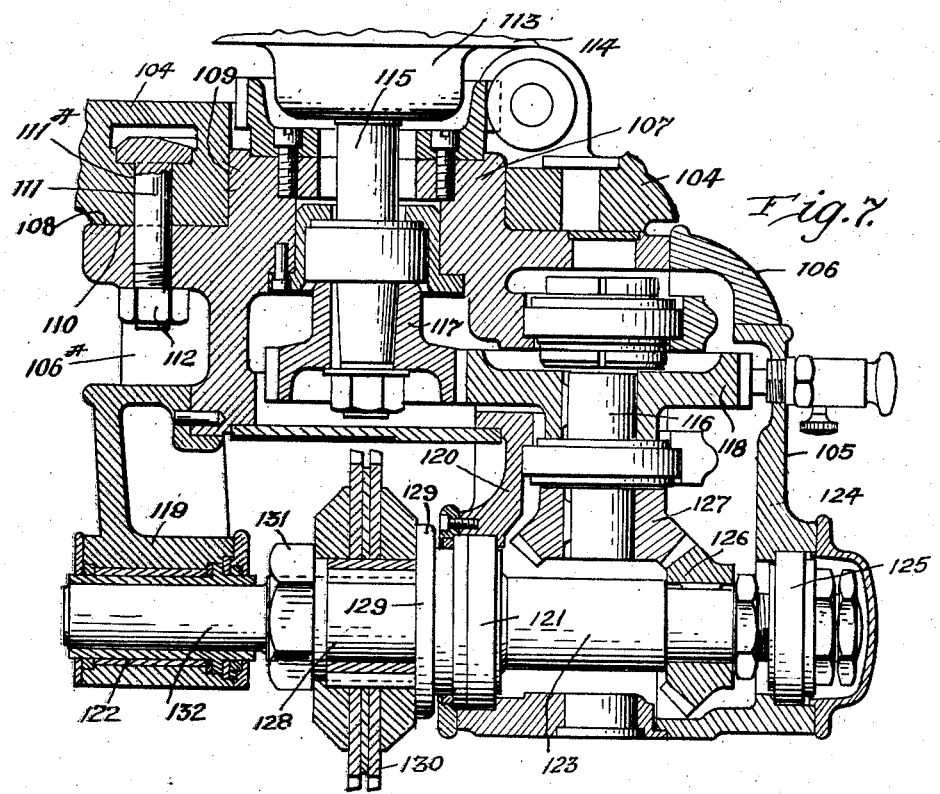
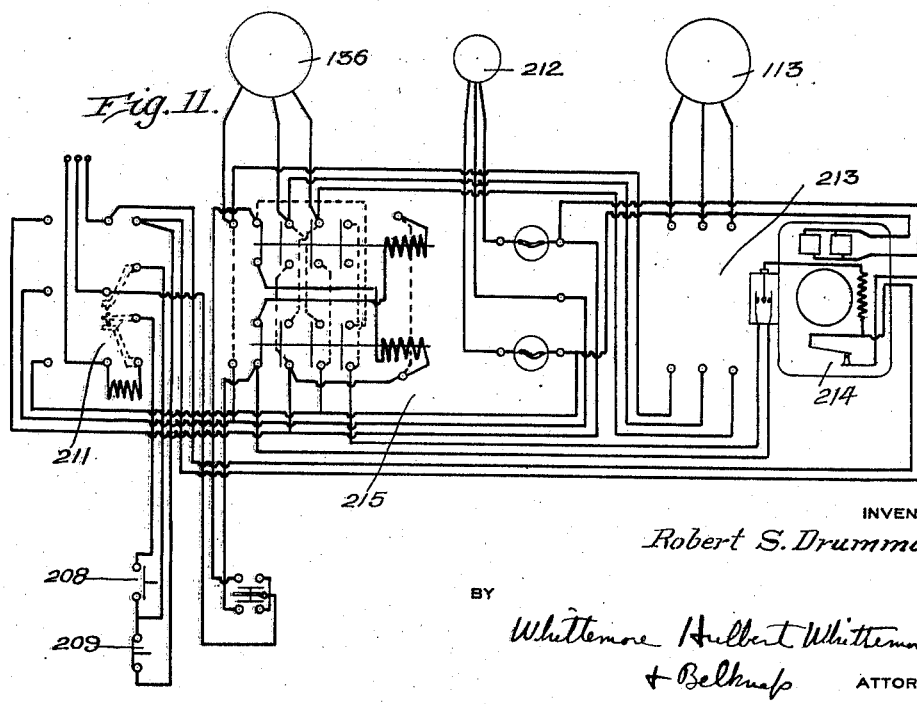
INVENTOR
Robert S. Drummond.
BY
Whittemore Hulbert Whittemore
 + Belknap     ATTORNEYS.

Jan. 20, 1942.  R. S. DRUMMOND  2,270,421
MACHINE FOR CUTTING GEARS
Filed Jan. 26, 1935  6 Sheets-Sheet 6
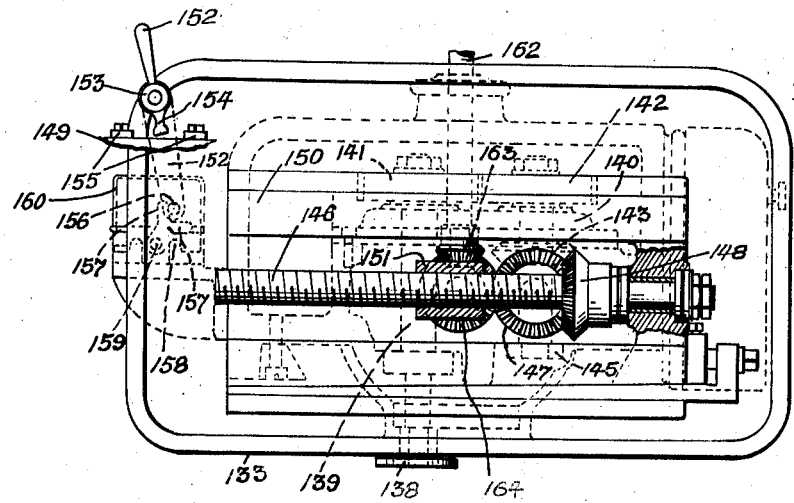
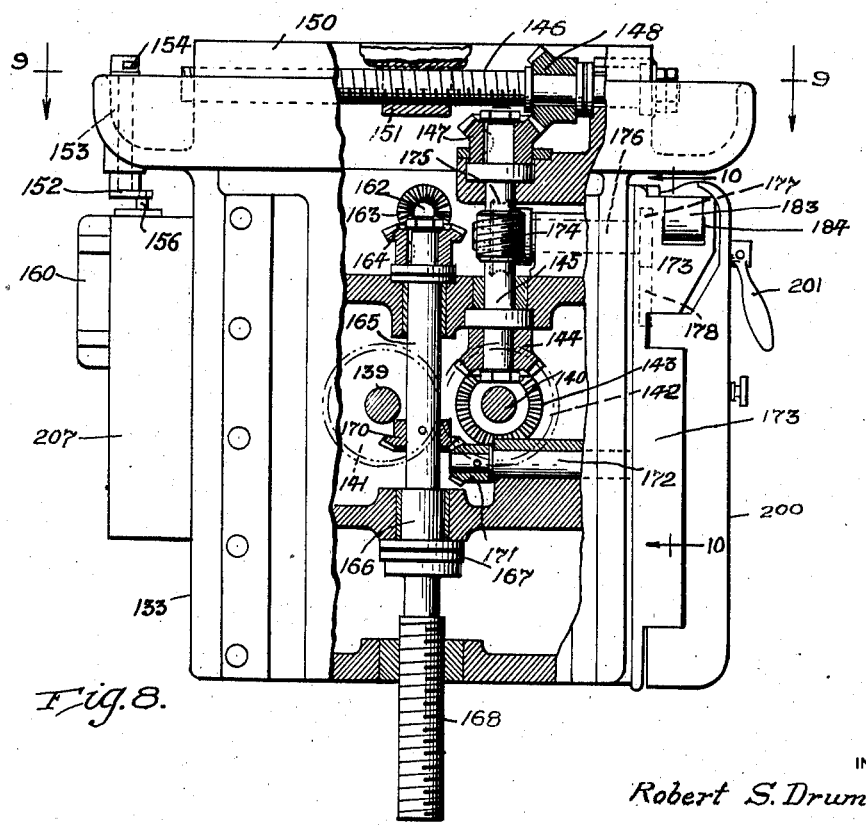
INVENTOR
Robert S. Drummond
BY
Whittemore Hulbert Whittemore
& Belknap  ATTORNEYS.

Patented Jan. 20, 1942

2,270,421

UNITED STATES PATENT OFFICE 2,270,421

MACHINE FOR CUTTING GEARS

Robert S. Drummond, Detroit, Mich.

Application January 26, 1935, Serial No. 3,662
In Great Britain August 17, 1931

21 Claims. (Cl. 90—1.6)

The invention relates to machines for finishing gears which have been fashioned by any suitable means such, for instance, as by hobbing. This application is a continuation in part of my co-pending application, Serial No. 626,768, filed July 30, 1932, in which a method of cutting gears has been claimed. The machine forming the subject matter of this invention embodies some of the features set forth in my co-pending application, Serial No. 3,663, filed of even date herewith, which application is a continuation in part of other co-pending applications, Serial Nos. 547,704, filed June 29, 1931, now Patent No. 1,989,650; 604,575, filed April 11, 1932, now Patent No. 1,989,651; and 626,769, filed July 30, 1932, now Patent No. 1,989,652.

The principal object of the present invention is to obtain an improved machine adapted for commercially finishing gears in accordance with the method set forth in my co-pending application 626,768, above referred to. Broadly stated, the improved method of finishing gears comprises mating a roughed-out gear member to be finished with a rotary finishing tool member having conjugate teeth, the axes of said gear and tool members being non-parallel, having no common plane and having an angular difference between a lower limit of three degrees and an upper limit less than thirty degrees. The tool is of a form similar to that of a lap or intermeshing gear, but is provided with one or more grooves which interrupt the continuity of the surface longitudinally of each tooth. The rotary tool forms the subject matter of my co-pending applications Serial Nos. 52,565 and 52,566 filed December 2, 1935, now Patent No. 2,126,178. This has the effect of causing a cutting of the surface as hereinafter more fully described. The machine is particularly adapted for correcting the form of a rough cut gear prior to the heat treatment of the same, so that the amount of grinding or lapping necessary after heat treatment is reduced to the minimum.

In the drawings:

Figure 1 is a perspective view of a machine embodying my invention, showing one form of finishing tool in engagement with a gear to be finished;

Figure 2 is a vertical central section through the machine;

Figure 3 is a sectional plan view;

Figure 4 is a diagram illustrating the operation of the machine and the electric timing mechanism therefor;

Figure 5 is a perspective view of a modified construction of gear finishing machine;

Figure 6 is a sectional side elevation thereof;

Figure 7 is a vertical section on the line 7—7 of Figure 6;

Figure 8 is a vertical section on the line 8—8 of Figure 6;

Figure 9 is a sectional plan view on the line 9—9 of Figure 8;

Figure 10 is a vertical section on the line 10—10 of Figure 8;

Figure 11 is an electrical diagram.

One form of machine embodying my invention is shown in Figures 1 to 4 and comprises essentially an arbor A for the gear to be finished, an arbor B for the finishing tool adjustable in spacing and in angular relation to each other so that the work may be placed in intermeshing relation with the tool. The arbor B is driven from a motor C through the medium of a step-down transmission D, shaft D', pulley $D^2$, belt E and pulley E'. The arbor A is mounted between head and tail stocks F and G on a carriage H which is slidably mounted on ways I on a head I' vertically adjustable on a column J. This column is supported on arcuate ways K on the bed L on which latter is mounted the arbor B and drive mechanism therefor. Thus the arbor A may be angularly adjusted with respect to the arbor B by adjustment of the column J around the arcuate ways K. The spacing between the arbors can be adjusted by raising or lowering the head I' on the column J and the arbor A may be axially reciprocated by movement of the carriage H on the ways I. As shown, the mechanism for accomplishing this reciprocation consists of a further step-down gearing M which actuates a crank M' adjustable in throw which in turn is connected by a link N to a vertically extending rockshaft N'. Splined on this rockshaft N' is a gear wheel $N^2$ for actuating a rack $N^3$ on the carriage H. Thus simultaneously with the rotation of the arbors A and B a slow reciprocating movement is imparted to the arbor A in an axial direction by the movement of the carriage H. The amount of movement is determined by the adjustment of the throw of the crank M' and the timing is such that for a rotational speed such as 400 R. P. M. the reciprocation of the carriage is only 4 inches per minute. The reciprocation should be proportioned to the diameter of the work to provide a selective rate of feed for each revolution of the work. The amount of reciprocation of the work is just sufficient to cause the cutting edges of the finishing tool to traverse the entire width of the work gear without permitting the work gear to pass out of contact with the guiding surfaces of the finishing tool on opposite sides of the cutting edges.

The machine is also preferably provided with automatic reversing mechanism by which, after the work has completed one stroke of the reciprocation, it is reversed and fed in the opposite direction. It is also preferable to reverse the direction of rotation of the work gear and finishing tool when the feed is reversed. Any suitable reversing mechanism may be employed but, as diagrammatically shown in Figure 4, there is a reversing electric switch O actuated through timing gears O' which causes the reversal of the electric motor C after a predetermined number of revolutions thereof.

In the operation of the machine as thus far described, the gear Q to be finished is mated with a suitable finishing tool having a helical angle such that when in proper mesh with the gear Q the axes of the gear and tool will be inclined at an angle to one another between the limits of three degrees and thirty degrees, preferably in the neighborhood of ten degrees.

After the machine has been properly set, it is started in operation by energizing the electric motor which causes the gear and tool to roll together and at the same time to have a longitudinal feed movement of the gear in the direction of the axis thereof. At the end of the feeding stroke in one direction, the feed is automatically reversed and at the same time the direction of rotation of the cutter is preferably reversed. The head I' is adjusted downwardly by means of the hand wheel 83 to cramp the gear Q against the finishing tool P. The head may be periodically adjusted downward until the desired amount of metal has been removed and the gear is entirely finished.

A modified gear finishing machine is illustrated in Figures 5 to 11. In this machine a compact structure is obtained which is automatic in operation and is adaptable particularly for accurate commercial finishing of roughed-out gears prior to heat treatment. As shown in the drawings, the frame 101 of the machine has an enlarged base portion 102 from which a column 103 extends upwardly at the rear of the machine and has a forwardly projecting portion 104. The frame of the machine is hollow and in addition to being designed to produce a rigid structure is adapted to house the driving mechanism of the machine. A head 105 adapted to swivel about a vertical axis is mounted in the forwardly projecting portion 104 of the frame. The head comprises a housing 106 having an annular bearing 107 and shoulder 108 for swivelly engaging the bearing 109 and thrust surface 110 of the frame portion 104. For supporting the head in position there are a plurality of supporting studs 111 projecting through arcuate slots 111A in the frame and secured with nuts 112 in cutaway portions 106A. The nuts may be loosened during the angular adjustment of the head and tightened when the head has the desired angularity. In the upper portion of the frame is mounted an electric motor 113 having a suitable gear reduction mechanism 114 within the hollow frame and having a driven shaft 115 depending into the head 105. A second vertical shaft 116 is journaled within the head 105 and is drivingly connected to the shaft 115 by the gears 117 and 118. The head 105 is provided with the bearing retaining portions 119 and 120, the latter receiving a main bearing 121 for the horizontally arranged shaft 123. The head 105 is also provided with a cover 124 having a second main bearing 125 for the shaft 123. For rotating the shaft, there is mounted thereon a bevel gear 126 which meshes with the bevel gear 127 on the lower end of the vertical shaft 116. The forward end of the shaft 123 is provided with a cylindrical portion 128 on which a gear finishing tool 130 may be mounted. The tool is retained in position against a collar 129 by a retaining nut 131 which in turn is on a guiding spindle 132 supported within a bearing 122. With the construction thus far described, the rotation of the electric motor 113 transmitted through the gearing drives the finishing tool 130 about a horizontal axis which may be adjusted angularly if desired by means of the swivel mounting of the head 105.

Beneath the head 105 is the work table indicated generally by the numeral 133. The table is vertically adjustable on ways 134 carried by the column 103. The table has a bracket 135 at the rear thereof projecting into the hollow column and supporting an electric motor 136 and gear reduction mechanism 137. A coupling 138 connects the mechanism 137 to a horizontal shaft 139 which in turn is connected to the parallel shaft 140 by change gears 141 and 142. The shaft 140 is connected by bevel gears 143 and 144 to the vertical shaft 145 which in turn drives the horizontal screw 146 through the bevel gears 147 and 148. A carriage 149 is mounted on horizontal ways 150 and has a depending nut 151 engaging the screw 146 for feeding the same. It will, therefore, be apparent that whenever the electric motor 136 is energized the carriage 149 will be fed axially by the feed screw 146. In order to reverse the direction of feed the electric motor 136 is reversed. For automatically reversing the carriage a suitable mechanism is provided. As shown, this comprises a lever 152 pivoted at 153 on the table and having a lug 154 intermediate the two adjustable stops 155 on the carriage 149. The lever has a pin 156 arranged intermediate the arms 157 of a lever 158 which in turn oscillates about a shaft 159. This shaft extends within a box 160 containing a reversing electric switch which being of conventional construction is not shown in detail. It will be apparent, however, that the stops 155 on the carriage alternately oscillate the lever 152 which in turn trips the lever 158 and oscillates the shaft 159 of the reversing switch. The reversing switch is diagrammatically illustrated in the electric diagram.

The table 133 is vertically adjustable on the ways 134 by means of a hand wheel 161 in the front of the machine. This wheel is mounted on a shaft 162 extending within the hollow table and has a beveled pinion 163 thereon engaging a beveled gear 164 on a vertical shaft 165. The shaft is rotatably mounted in a bearing 166 on the table and is adapted to elevate and lower the table through the thrust bearing 167. A feed screw 168 extends downwardly from the shaft 165 and engages a nut 169 mounted on and secured to the base of the machine. Thus by rotating the hand wheel the table may be adjusted toward and away from the head 105. For automatically feeding the table 133 toward the head 105 suitable automatic mechanism is provided. A beveled gear 170 on the shaft 165 engages the beveled gear 171 on the horizontal shaft 172 which in turn extends into a box 173 on the opposite side of the table from the box 160. The vertical shaft 145 has a worm 174 thereon meshing with a worm wheel 175 on a horizontal shaft 176 which also projects into the box 173 above the shaft 172. The box 173 contains the automatic feed mechanism for elevating the table 133 during the reciprocation of the carriage 149. The shaft 176 is connected by the gears 177 and 178 to a parallel shaft 179 on which is mounted a disc 180. Attached to the disc are cam arms 181 and 182 which project outwardly beyond the outer surface of the disc. A lever 183 is fulcrumed in the box 173 at the point 184 and has its free end 185 connected by a link 186 to a ratchet mechanism 187 for periodically rotating the shaft 172. On the lever 183 is a cam roller 188 arranged in the path of oscillation of the cam arms 181 and 182 so that when either of the arms strike the roller the lever 183 is moved about its pivot 184 thus actuating the link 186. The shaft 172 carries a ratchet wheel 189 having teeth 190. A ratchet pawl 191 having a nose 192 engages the teeth 190. The ratchet pawl is pivotally mounted at 193 on a carrier 194 which in turn is slidable in the guide 195 and connected by a pin 196 to the link 186. A spring 197 normally holds the pawl in engagement with the ratchet teeth. Rotatably mounted on the shaft 172 is an adjustable arm 198 having an outer cylindrical surface 199 adapted to engage the nose 192 of the ratchet pawl.

In the operation of the ratchet mechanism as described it will be apparent that the shaft 179 being connected by gearing to the means for reciprocating carriage 149 rotates in timed relation to the reciprocation of the carriage. The gear ratio is such that during the normal reciprocation of the carriage the shaft is oscillated to a sufficient degree so that the arms 181 and 182 alternately strike the cam roller 188. Each time the cam engages the roller the ratchet mechanism is actuated causing the ratchet wheel to be advanced a predetermined distance thereby rotating the shaft 172 which in turn gives a predetermined movement to the feed screw 168. The arm 198 is set so that after a predetermined movement of the ratchet wheel 189 the surface 199 of the arm engages the ratchet pawl and prevents further feed movement of the ratchet wheel even though the shaft 179 continues to oscillate. As previously stated, the ratchet mechanism is within a box 173 on the side of the machine and is normally closed by a door 200 controlled by the door handle 201.

The reciprocable carriage 149 carries the head and tail stocks 202 and 203 between which may be mounted the arbor for carrying the gear to be finished. Where the gear to be finished is integral with a shaft the shaft itself may be mounted between the head and tail stocks, as illustrated in the drawings. For convenience in mounting, the shaft may be inserted between centers 204 and 205, the latter being axially adjustable by a suitable hand wheel 206. Since the gear to be finished is rotated only by the intermeshing action of the finishing tool no driving mechanism is required on the carriage 149.

The electric control mechanism for the machine is mounted in a box 207 on the same side of the table as the housing 160 for the reversing switch. The various elements of the control mechanism may be of standard construction and it will be sufficient to show only the electrical diagram whereby the various elements are corelated in order to cause the operation of the various parts of the machine. The electrical diagram is shown in Figure 11. 208 and 209 are push buttons for starting and stopping the machine respectively. They are located in a switch box 210 at the top of the machine, as shown in Figures 5 and 6. The push buttons control a magnetic switch 211 of conventional design. Thus when the machine is started by pressing the starter button 208 three electric motors are simultaneously operated: the head motor 113, the table motor 136 and the oil pump motor 212. A hand reversing switch 213 is arranged to change the direction of rotation of the head motor 113 with respect to the table motor 136 in order that the desired relation between these motors may be obtained. 214 represents an automatic stop mechanism adapted to stop the operation of the machine after a predetermined interval. The reversing switch 160 previously described as being mechanically operated at the end of each stroke is shown in the diagram as being electrically connected to reversing contactor mechanism 215. This mechanism electrically reverses both the head motor 113 and the table motor 136.

In the operation of the machine as previously described the desired finishing tool is mounted in the head 105 and the gear to be finished is mounted on the carriage 149 with its axis parallel to the axis of reciprocation of the carriage. The angular relation between the axis of the gear and the axis of the finishing tool is determined by the angular setting of the head 105. The table 133 is adjusted to the necessary height to obtain intermeshing engagement between the tool and gear and the arm 198 on the ratchet mechanism is adjusted to cause the desired automatic feed of the table toward the head. When the necessary adjustments have been made the machine is set in operation by pushing the starter button 208. This energizes the head motor and table motor, the head motor rotating the finishing tool and thereby driving the gear to be finished and the table motor causing a slow feed in the direction of the axis of the gear. When the table has progressed the desired distance to finish the entire width of the gear a stop 155 trips the lever 154 thereby actuating the reversing switch 160 which through the electric contactors 215 electrically reverses both the head motor and the table motor. This causes the finishing tool to rotate in the opposite direction while the feed is also in the opposite direction. Just prior to the actual tripping of the reversing switch the oscillating disc 180 in the box 173 has been rotated sufficiently to contact with the cam roller 188 and actuate the ratchet mechanism 187 thereby rotating the shaft 172 and consequently the feed screw 168. Thus just prior to the reversing of the motors the table is fed a predetermined distance toward the head thereby placing the gear and finishing tool under a predetermined cramp action for the succeeding lateral feed movement. As the operation continues the table is automatically fed toward the head at the end of each reciprocation until the desired amount of stock has been removed from the gear. At this point the arm 198 of the ratchet mechanism engages the pawl 191 and prevents further upward movement of the table. The gear and tool continue to rotate together and the reciprocation of the carriage continues for a predetermined movement of idling strokes during which time the surfaces of the gear teeth are given a final finishing action. At this time the automatic stop mechanism 214 comes into play and through the magnetic switch 211 stops each of the electric motors. The gear may then be removed and replaced by another rough cut gear and the cycle of operation is again repeated.

The finishing tool used in the machine as above described may be constructed in various ways, as set forth in my co-pending application, Serial No. 626,768 above referred to. As previously stated, the tool is of a form similar to that of an intermeshing gear and the helical angle of the teeth is so selected with respect to the helical angle of the gear to be finished that when in proper mesh the axes of the gear and the tool are crossed at an angle less than 30°.

In the operation of the gear finishing machine shown in Figure 5 with a rotary cutter the cutter is mounted in the head so that the gashes in the cutter are located over the center of rotation of the cutter head and is locked in position on the arbor which is supported on both ends in bearings.

The gear to be cut is mounted between centers and locked endwise, the table is then moved to the right or left to bring the gear under the center of the cutter head and the table is raised to bring the gear in contact with the cutter while it is stationary. The height of the table is noted on the graduations of the hand wheel and the table is then lowered and the gear is moved to the right hand end of its travel remaining in mesh with the cutter teeth. The electrical stop for this extreme of travel is then set and the horizontal table then moved to the opposite end the proper amount for the width of the gear and the electrical stop on the table is then set for this limit of travel.

The gear can then be raised to the setting obtained by contact with the cutter and when the motors are started it will revolve the gear and move the table to one side, the cut being taken preferably against the angle of the teeth on the cutter. At the end of the stroke the table will reverse and the head motor will reverse so that with opposite directions of movement of the table the cutter will run in opposite directions.

At each end of the table stroke the automatic mechanism raises the work gear toward the cutter a measured amount which is to be removed on the succeeding stroke of the table. This feed occurs at each end of the table movement until the desired depth of cut is obtained as determined by the set of the ratchet feed mechanism on the left hand side of the table.

Additional strokes may be taken without further feeding of the gear toward the cutter and this will cause the cutter to remove the former cutter marks which are of microscopic size and give the surface of the finished gear a higher degree of finish without material change in size of the teeth. Either at the end of the cutting strokes or the end of the cutting and idling strokes the electrical unit controlling the operation of the machine will automatically stop all the motors and bring the machine to rest at the end of the table stroke. The clamps on the work arbor are then released and the gear removed from the machine.

In deciding on the direction of rotation of the cutter and the relative travel of the table beneath the cutter it is worth noting that the cutter is rotated in such a direction relative to the table travel that the gear travels against the rotation of the cutter and against the angle of the teeth on the cutter. The best cutting action can thus be obtained although some cutting action and finishing effect is obtained with other combination of rotation of the cutter and the cross sliding motion of the gear.

The contact band on the gear being cut will be vertical of the tooth on a spur gear and diagonal on the tooth of a helical gear, the diagonal line increasing with the helix angle of the gear being cut.

This band of contact or path of contact is very narrow with large difference in crossed axes, such as 35°, and is very wide on gears cut with the crossed axes of 3°. The width of this banded contact is of great importance in the guiding of the gear to maintain correct angle on the teeth.

The freedom of cutting increases rapidly with the increased crossed axes between the cutter and the gear and is of correct amount above 3° and below 30°, being normally selected at between 10° and 15°.

The cutting action at 3° is considerably less than at 10° and from this point downward to parallel axes the burnishing effect becomes quite severe.

These comments are of particular importance because the contact between the cutter and the gear when using a rotary cutter is limited to a relatively narrow band normally less than the face width of commercial gears. Thus on a gear 2 inches wide the band may not be wider than three-quarters of an inch, and if the machine is reciprocated the face width of the gear and more, the entire surface will be finished by spreading the band of contact across its surface.

If the gear is traversed by the table in any other plane than parallel to its axes of rotation the effect will be to cut the teeth irregularly and if carried to extreme, the ends of the teeth on the gear will not be finished at all on the two ends as the cutter will remove material in an improper angle. This differentiates from the use of a rack cutter over which the gear can be rolled in any given angle and never leave the point of proper depth of mesh as the rack is in a flat plane whereas in the rotary cutter the plane of the teeth are in a circle and very rapidly leave the work gear if it is moved in any other plane than parallel to its axis of rotation.

The present application relates to a gear finishing machine and while the disclosure has been made of a particular type of gear finishing tool, it will be appreciated that the machine disclosed and covered in the claims will operate with tools having different specific characteristics. In some of the claims the tool is defined as having teeth provided with finishing surfaces and this, as will be readily apparent, is intended to cover tools of the type illustrated and described in the present application as well as equivalent tools adapted to finish the teeth of conjugate gears by machining or removing metal therefrom. By way of example, a lapping tool which removes metal by abrasion is referred to.

What I claim as my invention is:

1. A machine for finishing gears comprising an arbor for mounting a gear to be finished for free rotation, a finishing element in the form of a mating gear for said gear to be finished having teeth conjugate to the teeth of the gear to be finished, and positioned so that the axes of the element and of the gear to be finished lie in no common plane and cross at an angle of less than 30°, the teeth of said element being interrupted by narrow grooves forming cutting edges, means for driving one of said gears and means for causing relative movement of said gear and finishing element so that the center of crossed axes traverses the entire face of the gear to be finished, means operable at the end of each reciprocation to feed one of said gears toward the other, means for non-yieldingly maintaining the distance between said axes between feeding movements, timing means for stopping operation of the machine after a predetermined number of reciprocations, and pre-setting means independent of the timing means to interrupt the feeding movement after a definite number of reciprocations.

2. A machine for finishing gears comprising a frame having a column, a head supported on said column for swivel movement about a vertical axis, a motor having a vertical driving shaft in said head, a horizontal arbor journaled in said head and connected to said vertical shaft, a table vertically adjustable on said column, a motor carried by said table, a carriage on said table reciprocable horizontally, a second arbor on said carriage, said arbors adapted to support an intermeshed gear and gear-like tool, driving mechanism between said last mentioned motor and said carriage adapted to reciprocate said carriage, and means operable by the reciprocation of said carriage for feeding said table toward said head.

3. A machine for finishing gears comprising a frame, a table vertically adjustable on said frame, a swivel head on said frame above said table adapted for rotative adjustment about a vertical axis, a horizontal arbor carried by said swivel head, means for rotating said arbor, a carriage on said table movable horizontally, a second horizontal arbor on said carriage, said arbors adapted to support an intermeshed gear and gear-like tool, means for reciprocating said carriage, and means operable at the end of each reciprocation for feeding said table toward said head.

4. A machine for finishing gears comprising a pair of arbors adapted to support an intermeshing gear and gear-like cutting tool with their axes crossed at an angle less than 30°, means for rotating one of said arbors, means for causing relative reciprocatory movement of said arbors so that the center of crossed axes traverses the entire face of said gear, means operable by the reciprocation to feed one of said arbors toward the other, and means for non-yieldingly maintaining the distance between arbors during each reciprocation.

5. A machine for finishing gears comprising a pair of arbors adapted to support an intermeshing gear and gear-like cutting tool with their axes crossed at an angle less than 30°, means for rotating one of said arbors, means for causing relative reciprocatory movement of said arbors so that the center of crossed axes traverses the entire face of said gear, means responsive to the reciprocations to feed one of said arbors toward the other at the end of a reciprocation, and means for maintaining a constant distance between said arbors during each reciprocation.

6. In a machine of the character described, a head, an arbor on said head, a table mounted for feeding movement toward said head, a carriage on said table mounted for lateral reciprocation, means carried by said table for reciprocating said carriage, an arbor on said carriage, said arbors adapted to support an engaged rotary tool and work piece, means operable at the end of each reciprocation to feed said table toward said head, and presetting means to interrupt said feeding movements after a predetermined number of reciprocations.

7. In a machine of the character described, a head, an arbor on said head, a table mounted for feeding movement toward said head, a carriage on said table mounted for lateral reciprocation, means carried by said table for reciprocating said carriage, an arbor on said carriage, said arbors adapted to support an engaged rotary tool and work piece, means operable at the end of each reciprocation to feed said table toward said head, timing means for stopping said machine after a predetermined number of reciprocations, and presetting means independent of said timing means to interrupt said feeding movements after a predetermined number of reciprocations.

8. A machine of the character described comprising a head portion, an arbor on said head portion, a table mounted for feeding movement toward said head, a carriage mounted for lateral reciprocation on said table, a second arbor on said carriage, said arbors adapted to support an engaged rotary tool and work piece, motor means carried by said table for reciprocating said carriage, and means operable in response to said reciprocations to feed said table toward said head at the end of each reciprocation.

9. A machine for finishing gears comprising a pair of arbors adapted to support an intermeshing gear and gear-like cutting tool with their axes crossed at an angle less than 30°, means for rotating one of said arbors, means for causing relative reciprocatory movement of said arbors so that the center of crossed axes traverses the entire face of said gear, means responsive to the reciprocation to feed one of said arbors toward the other at the end of a reciprocation, means for maintaining a constant distance between said arbors during each reciprocation, and means for reversing the rotation of said arbors at the end of each reciprocation.

10. A gear finishing machine comprising a frame, a head on said frame mounted for adjustment about an axis, an arbor on said head rotatable about an axis normal to said first mentioned axis, a table on said frame adjustable parallel to said first mentioned axis, a carriage on said table movable in a plane parallel to said arbor, a second arbor on said carriage with its axis parallel to the plane of movement of said carriage, said arbors adapted to support an intermeshing gear and gear-like tool, a motor for translating said carriage, means for feeding said table toward said head, a motor for rotating one of said arbors, a switch periodically operated at predetermined intervals for reversing both of said motors, said feeding means being automatically operated in response to said translations for feeding said table toward said head by predetermined increments substantially at the end of each translation.

11. A machine for finishing gears comprising a pair of arbors adapted to support an intermeshing gear and gear-like cutting tool with their axes crossed at an angle less than 30°, means for rotating one of said arbors, means for causing relative reciprocatory movement of said arbors so that the center of crossed axes traverses the entire face of said gear, means operable at the end of each reciprocation to feed one of said arbors toward the other, means for maintaining a constant distance between said arbors during each reciprocation, timing means for stopping operations of the machine after a predetermined number of reciprocations, and presetting means independent of said timing means to interrupt the feeding movement after a predetermined number of reciprocations.

12. A machine for finishing gears comprising an arbor for mounting a work gear to be finished, a finishing gear in the form of a mating gear for said work gear having teeth conjugate to the teeth of the work gear, the teeth of said finishing gear being provided with finishing surfaces, means for positioning said gears so that their axes are inclined at an angle of less than 30°, means for causing relative reciprocation of said gear and finishing gear, means operable in accordance with each reciprocation to feed one of said gears toward the other, means operable to interrupt the feeding movement after a definite number of reciprocations and means for stopping the operation of the machine thereafter.

13. A machine for finishing gears comprising an arbor for mounting a work gear to be finished, a finishing tool in the form of a mating member for said work gear having teeth conjugate to the teeth to be produced on said work gear, said tool having the teeth thereof provided with finishing surfaces, means for causing relative reciprocation of said gear and finishing tool, means operable in accordance with said reciprocation to feed said gear and tool relatively toward each other, means serving to interrupt said feeding movement after a predetermined period of reciprocation and means for stopping the machine thereafter.

14. A machine for finishing gears comprising a rotary support for a work gear to be finished, a finishing tool having teeth conjugate to the teeth of the work gear, the teeth of said tool having finishing surfaces, means for rolling said gear in mesh with said tool with the axes of said gear and tool crossed at an angle of less than 30°, and for providing a relative motion between said gear and tool having a component parallel to the axis of said work gear, and means operable in accordance with said relative motion for relatively feeding said gear and tool toward each other.

15. A machine for finishing gears comprising a rotary support for a work gear to be finished, a rotary finishing tool having teeth conjugate to the teeth of the work gear, the teeth of said tool having finishing surfaces, means for rolling said gear in mesh with said tool with the axes of said gear and tool crossed at an angle of less than 30°, and for providing a relative translation between said gear and tool having a component parallel to the axis of said work gear, and means operable in accordance with said relative translation for relatively feeding said gear and tool toward each other substantially at the end of a translation.

16. A machine for finishing gears comprising a rotary support for a work gear to be finished, a finishing tool having teeth conjugate to the teeth of the work gear, the teeth of said tool having finishing surfaces, means for rolling said gear in mesh with said tool with the axes of said gear and tool crossed at an angle of less than 30°, and for providing a relative motion between said gear and tool having a component parallel to the axis of said work gear while rigidly maintaining the axes of the gear and tool in predetermined spaced relation, and means operable in accordance with said relative motion for relatively feeding said gear and tool toward each other.

17. A machine for finishing gears comprising a rotary support for a work gear to be finished, a finishing tool having teeth conjugate to the teeth of the work gear, the teeth of said tool having finishing surfaces, means for rolling said gear in mesh with said tool with the axes of said gear and tool crossed at an angle of less than 30°, and for providing a relative motion between said gear and tool having a component parallel to the axis of said work gear, and means operable in accordance with said relative motion for relatively feeding said gear and tool toward each other, and means operable to interrupt said feeding movement when said tool reaches a predetermined depth.

18. A machine for finishing gears comprising a rotary support for a work gear, a finishing tool having teeth conjugate to the teeth of the work gear, the teeth of said tool having finishing surfaces, a support for said tool adapted to position said tool in mesh with the gear with their axes crossed at an angle of less than 30°, means for rolling said gear and tool in mesh, means for providing a relative motion between said gear and tool generally parallel to the axis of said gear, and means operable in accordance with said relative motion for relatively feeding said gear and tool toward each other.

19. A machine for finishing gears comprising a rotary support for a work gear, a rotary finishing tool having teeth conjugate to the teeth of the work gear, the teeth of said tool having finishing surfaces, a support for said tool adapted to position said tool in mesh with the gear with their axes crossed at an angle of less than 30°, means for rolling said gear and tool in mesh, means for providing a relative motion between said gear and tool generally parallel to the axis of said gear, and means operable in accordance with said relative motion for relatively feeding said gear and tool toward each other.

20. A machine for finishing gears comprising a rotary support for a work gear, a finishing tool having teeth conjugate to the teeth of the work gear, the teeth of said tool having finishing surfaces, a support for said tool adapted to position said tool in mesh with the gear with their axes crossed at an angle of less than 30°, means for rolling said gear and tool in mesh, means for providing a relative reciprocation between said gear and tool generally parallel to the axis of said gear, and means operable in accordance with said relative reciprocation for relatively feeding said gear and tool toward each other substantially at the end of a reciprocation.

21. A machine for finishing gears comprising a rotary support for a work gear, a finishing tool having teeth conjugate to the teeth of the work gear, the teeth of said tool having finishing surfaces, a support for said tool adapted to position said tool in mesh with the gear with their axes crossed at an angle of less than 30°, means for rolling said gear and tool in mesh, means for providing a relative reciprocation between said gear and tool generally parallel to the axis of said gear, and means operable in accordance with said relative reciprocation for relatively feeding said gear and tool toward each other substantially at the end of a reciprocation, the relative reciprocation between the gear and tool being such as to shift the center of crossed axes from one end to the other of the teeth of the gear, whereby the relative feeding movement referred to takes place when the center of crossed axes of the gear and tool is at or adjacent one end of the teeth of said gear.

ROBERT S. DRUMMOND.